(No Model.) 2 Sheets—Sheet 1.
N. B. SHYER.
INDEX.
No. 429,970. Patented June 10, 1890.
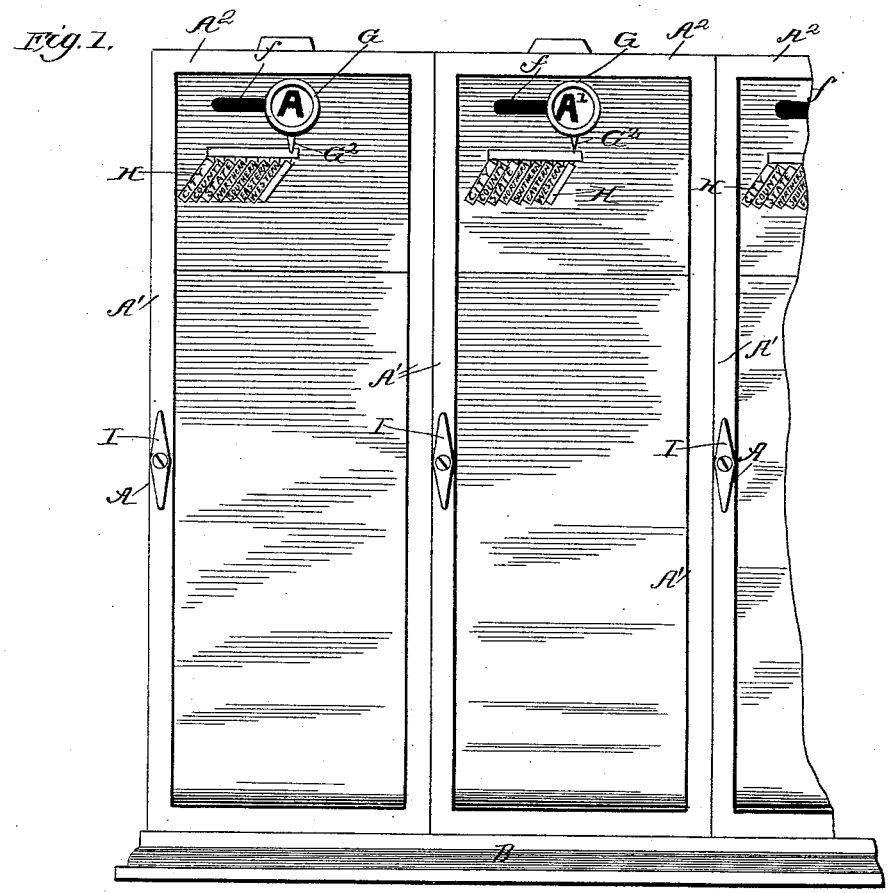
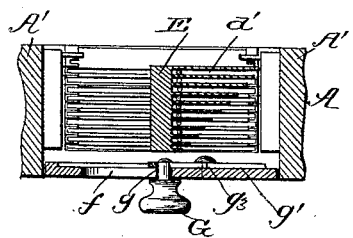
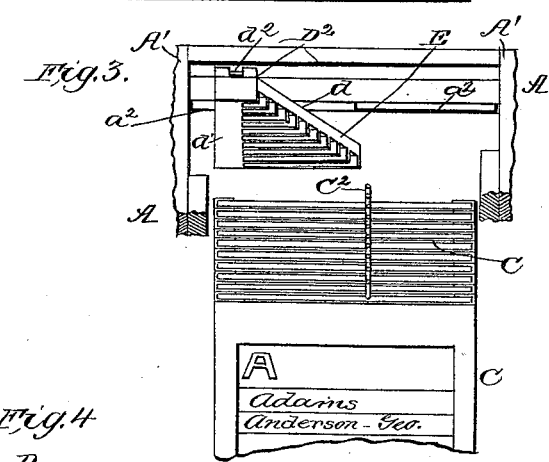
WITNESSES:
Fred G. Dieterich
P. B. Turpin
INVENTOR
Nathan B. Shyer.
BY
Munn & Co
ATTORNEY (No Model.) 2 Sheets—Sheet 2.
N. B. SHYER.
INDEX.
No. 429,970. Patented June 10, 1890.
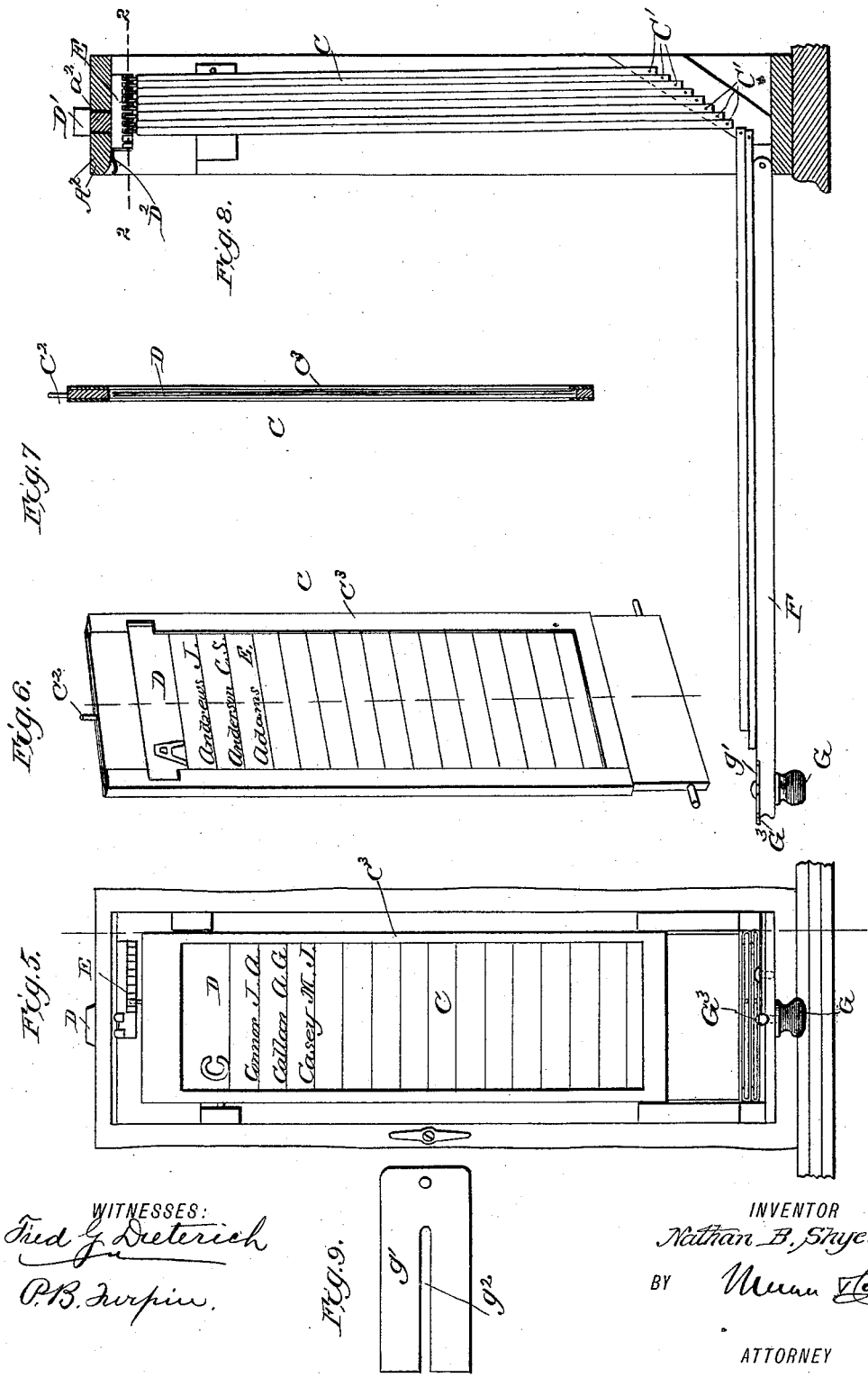
WITNESSES:
Fred J. Dieterich
P. B. Turpin
INVENTOR
Nathan B. Shyer
BY Munn & Co.
ATTORNEY

UNITED STATES PATENT OFFICE.

NATHAN B. SHYER, OF HOPKINSVILLE, KENTUCKY.

INDEX.

SPECIFICATION forming part of Letters Patent No. 429,970, dated June 10, 1890.

Application filed April 23, 1889. Serial No. 308,334. (No model.)

*To all whom it may concern:*

Be it known that I, NATHAN B. SHYER, of Hopkinsville, in the county of Christian and State of Kentucky, have invented certain new and useful Improvements in Indexes, of which the following is a specification.

My invention is an improved index, seeking to provide a novel, simple, and convenient index to ledgers, journals, or other books requiring an index; and the invention consists in certain novel constructions and combinations of parts, as will be hereinafter described, and pointed out in the claims.

In the drawings, Figure 1 is a front elevation of my improvement, partly broken away. Fig. 2 is a cross-sectional view of one of the sections drawn through the lower portion of the latch. Fig. 3 is a perspective view showing the inside of the top of one of the sections and the leaves partly open. Fig. 4 is a detail perspective view of the latch. Fig. 5 is a front view of one of the sections with some of the leaves lowered. Fig. 6 is a detail perspective view of one of the leaves. Fig. 7 is a detail longitudinal section of one of the leaves. Fig. 8 is a vertical section of one of the sections, some of the leaves being open; and Fig. 9 is a detail view of the slotted plate.

In carrying out the invention I provide a number of frames or casings A, mounted preferably on a base B, such frames A having side boards A' and top $A^2$.

Within each case or frame A, I provide a number of sections C, which for convenience of reference I shall term, broadly, "leaves," and more specifically "slip-holding leaves," being preferably formed with a frame-like portion $C^3$, grooved to receive and hold slips D, and such slips being preferably doubled, so that when both sides of the said slips are written on they may be separated and suitably packed or stored away. The leaves C are pivoted within the frame or case, preferably in the particular manner shown, in which they are pivoted or hinged at or near their lower ends at C', (see Fig. 8,) and the hinge of each leaf being above that next in front of it a distance at least equal the thickness of such latter section, so that when the leaves are opened or turned forward they may all rest in a horizontal line and one upon the other, as will be understood from Fig. 8. It will also be seen that the pivotal points of the said leaves are arranged in rear of the centers of gravity of same, so that when released they will automatically open or fall forward—in other words, the leaves are balanced to fall forward when released. Now to hold the leaves I provide a latch E, movable and constructed to hold all the leaves or to release same in succession from front to rear. This is preferably effected by the construction shown, in which each of the leaves C has a pin or projection $C^2$, and the latch E is a slide movable longitudinally in a guide-slot $a^2$ in the top of the frame, and provided with a handle-like portion D D' above such top, by which the latch may be adjusted to hold or release the leaves. At one side the latch-block is inclined from front to rear at $d$, and is provided in such inclined edge with notches $d'$ to receive the pins or projections $C^2$ on the leaves, the construction, as shown and described, serving to release the leaves successively from front to rear as the latch is moved laterally from locked to open position. At its front edge the latch D has a notch or recess $d^2$, preferably formed in a plate $D^2$, projecting from the latch and formed at $d^3$ to operate as a spring-catch to hold the door F closed. This door F is hinged at its lower end to the frame or casing, and may have its inner face constructed to form a holder for a single slip, as shown. I also provide on the door, near its free edge, a slot $f$, through which projects the shank $g$ of a knob or handle G, which has on the inner side of the door F a plate $g'$, slotted at $g^2$ to receive a guide-screw $g^3$, and provided with a tongue or portion $G^3$, engaging the latch D by entering the notch or recess $d^2$, so that the lateral movement of the knob G may operate to adjust the latch to hold all the leaves or release one, two, or more of the same, as desired. To enable the accurate releasing of the leaves, I provide the knob G with a pointer or indicator $G^2$, which moves along a suitably-marked index H, arranged adjacent to the slot $f$.

The top of the door is adapted at $f'$ for engagement by the spring-like catch $d^3$, provided on the latch D.

The space on the door below the index H may be utilized by inscribing thereon such standard information as is daily used in the offices—such, for instance, as interest-tables, and the like.

Manifestly, the frame or carriage A may be of such size as desired or necessary to receive the number of slips necessary to the quantity of indexing to be done, which may depend on the quantity of business done, the elaborateness of the indexing, or both.

The base adapts the device to be seated on the top of a desk when the latter is suitably formed to receive it, or it may be supported on brackets or otherwise up against the wall.

It will be seen that the slips can be written on when in the holding-leaves, or may be conveniently removed when desired to write thereon.

In practice it is preferred to place on the door of each casing, usually on the button or handle, near the top thereof, the initial letter of the names indexed in the said particular casing or frame, and to write on each slip the name and address, also the page of the ledger or journal or other reference which it is desired to make in connection with such name, just like an ordinary index-book. It will be also understood that each letter may be divided into classes or divisions in any desired manner, proper representation of the classification or division being made on the door.

The index may include the entire alphabet, one or more of the casings or frames A being provided for each of the letters most used, and the letters little used being doubled up and two or three or more of same being indexed in the same part A.

In case there should be several leaves open and it is desired to go through them for any purpose, they may be thrown up one at a time and secured by the button I, pivoted between its ends and arranged to turn in front of and hold the leaves up.

Among other advantages possessed by this index over the ordinary index-book may be stated the following: the durability of the improved device, its convenience in general reference, and especially in posting from the journal to the ledger, the improved index being to the ledger, and avoiding the unnecessary handling of very large books.

In manipulating the index it may be operated by one hand grasping the knob or handle and the other working the book. By moving the knob or button to the left the latch may be adjusted to release the first, second, third, or other leaf, counting from the front.

When the book with which the index has been used is to be closed, the slips are taken out and parted, which can be easily accomplished by running the blade of a knife between them, and each of the sections is then put in an album formed to receive them, so the index-slips can be preserved, as desired.

Having thus described my invention, what I claim as new, and desire to secure by Letters Patent, is—

1. The combination, substantially as herein described, of the frame or casing, the leaves hinged or pivoted therein and arranged to fall forward when released, a latch by which said leaves may be held closed and be released, and a button I, arranged to turn in front of and hold up any desired one of the leaves, substantially as set forth.

2. The improved index herein described, comprising the frame or casing, the series of leaves therein and the latch by which to hold such leaves closed, said latch being constructed to engage the several leaves when closed and to release two or more of the said leaves at a single movement of the latch, substantially as set forth.

3. In combination with the series of leaves having pins or projections, the movable latch having a series of notches arranged to receive and hold said pins or projections and to release them successively as the said latch is moved, substantially as set forth.

4. An improved index comprising a frame or casing, leaves arranged therein and provided with pins or projections, and the latch having one side inclined and provided in such inclined side with notches or openings to receive the pins or projections on the leaves, substantially as set forth.

5. In an apparatus substantially as described, the combination of the casing or frame, the leaves thereon, the latch arranged to secure such leaves and movable to release the same, the door and the button or handle engaging the latch and movable, whereby to operate the same, substantially as set forth.

6. The combination of the frame or casing, hinged leaves, the movable latch constructed to hold and successively release said leaves, and having recess or notch $d^2$, the door having a slot, the button having its shank operating in said slot, plate $g'$, connected with the inner end of such shank and having a tongue or portion $G^3$ entering the recess $d^2$ of latch D, all substantially as set forth.

7. The combination of the frame or casing, the leaves therein, the door, the latch for securing said leaves and provided with a plate $D^2$, formed at $d^3$, to operate as a spring-catch for securing the door, and having a notch or recess $d^2$, the knob-supports on the door, and the plate $g'$ connected with such knob and having a tongue or portion to enter the notch or recess $d^2$, substantially as set forth.

NATHAN B. SHYER.

Witnesses:
W. G. GOOCH,
WM. L. WALLER.